(12) United States Patent
Severinsson

(10) Patent No.: US 6,892,867 B2
(45) Date of Patent: May 17, 2005

(54) ROLLER ARRANGEMENT IN A TORQUE TRANSMITTING DEVICE

(75) Inventor: Lars Severinsson, Hishult (SE)

(73) Assignee: Haldex Traction AB, Landskrona (SE)

( * ) Notice: Subject to any disclaimer, the term of this patent is extended or adjusted under 35 U.S.C. 154(b) by 81 days.

(21) Appl. No.: 10/275,160

(22) PCT Filed: May 4, 2001

(86) PCT No.: PCT/SE01/00955

§ 371 (c)(1),
(2), (4) Date: Dec. 3, 2002

(87) PCT Pub. No.: WO01/85484

PCT Pub. Date: Nov. 15, 2001

(65) Prior Publication Data

US 2003/0132081 A1 Jul. 17, 2003

(30) Foreign Application Priority Data

May 10, 2000 (SE) .............................................. 0001722

(51) Int. Cl.⁷ .......................... B60K 17/35; F16D 43/21
(52) U.S. Cl. ............................. 192/20; 192/35; 192/40
(58) Field of Search ............................ 192/20, 35, 40, 192/54.52, 70.23, 84.7, 103 R

(56) References Cited

U.S. PATENT DOCUMENTS

| | | | | |
|---|---|---|---|---|
| 3,323,779 A | * | 6/1967 | Burnett ........................ | 254/344 |
| 5,405,293 A | * | 4/1995 | Severinsson ................. | 192/35 |
| 6,247,566 B1 | * | 6/2001 | Severinsson ................. | 192/20 |

FOREIGN PATENT DOCUMENTS

| | | | |
|---|---|---|---|
| JP | 5-126164 A | * | 5/1993 |
| WO | WO 98/26950 A1 | * | 6/1998 |
| WO | WO 03/004894 A1 | * | 1/2003 |

* cited by examiner

Primary Examiner—Rodney H. Bonck
(74) Attorney, Agent, or Firm—Breiner & Breiner, L.L.C.

(57) ABSTRACT

A device for transmitting torque between two rotatable, coaxial shaft members (2, 4) has a number of alternate clutch discs (5, 6), connected to the two shaft members and engageable to counteract differential rotational speed between the shaft members. The rotational movement may be braked by braking means (26–28), whose rotational velocity is proportional to the rotational speed differential. Means for transmitting the rotational speed differential to the braking means comprises a roller arrangement (20–25).

4 Claims, 2 Drawing Sheets

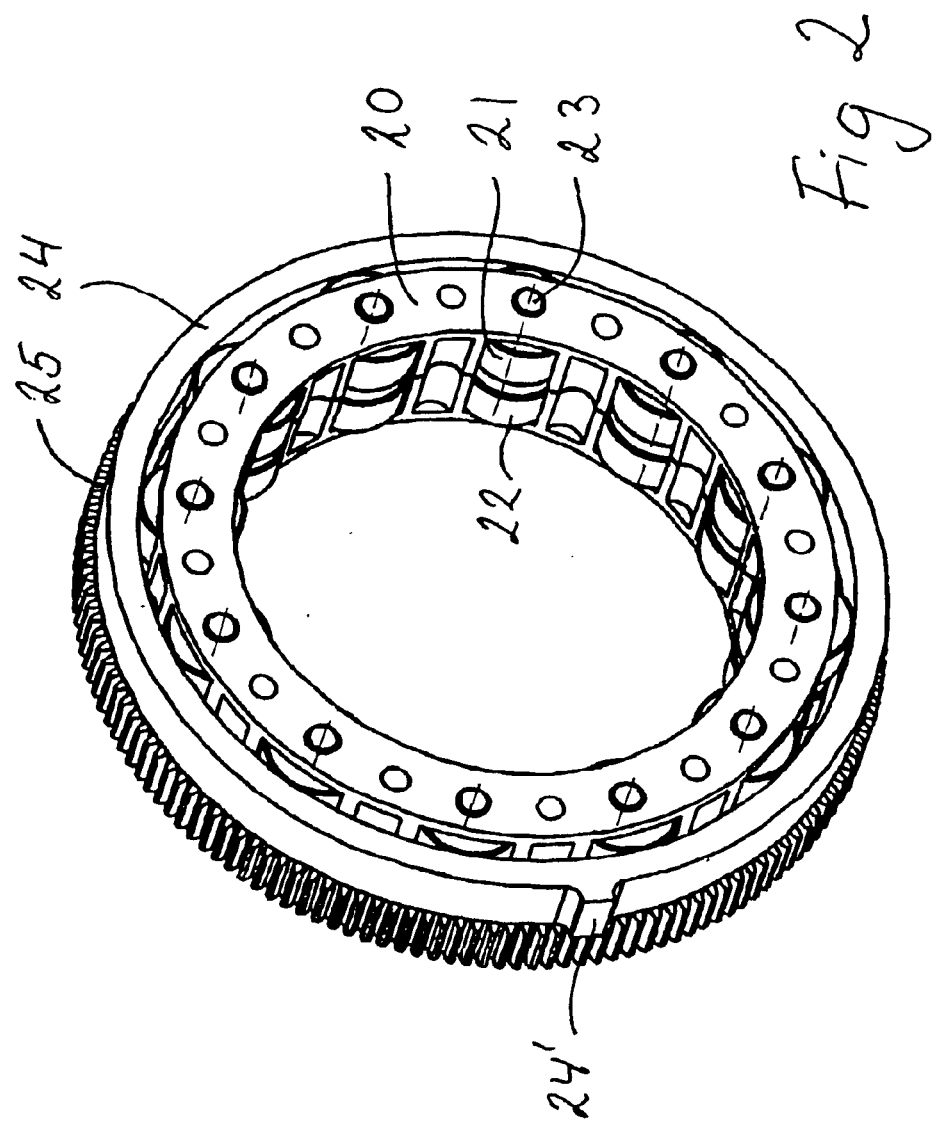

ROLLER ARRANGEMENT IN A TORQUE TRANSMITTING DEVICE

TECHNICAL FIELD

The present invention relates to a device for transmitting torque between two rotatable, coaxial shaft members, the device comprising a number of alternate clutch discs, connected to the two shaft members and engageable to counteract differential rotational speed between the shaft members, and braking means for braking rotational movement, the rotational velocity in the braking means being proportional to said differential rotational speed.

BACKGROUND OF THE INVENTION

Devices for transmitting torque between two rotatable shafts are known from numerous patent publications. The two shafts may be the output shafts of a road vehicle differential mechanism. The device may accordingly in this case be called a differential brake. There may, however, be other instances when it is desired to counteract a certain rotational speed differential between two shafts, a typical example being the two shafts to the driven front and rear axle, respectively, of a four-wheel-drive vehicle.

There may be different techniques to obtain the counteracting of the rotational speed differential, but several of the known solutions rely on a hydraulic system.

A device of the kind defined is shown in WO 98/26950 and may be defined as an electromechanical device, as the braking means used therein are electrical or electromagnetical, which means that the normally used hydraulic system is dispensed with.

This device comprises gear means connected to the first shaft member, a pressure plate, which is connected to the second shaft member and is axially displaceable against the clutch discs for their engagement, and transmission means between the gear means and the pressure plate for axially displacing the pressure plate against the clutch discs at a certain rotation differential between the gear means and the pressure plate, the braking means being connected to the gear means for providing a braking force to the transmission means for its axial displacement.

In this device the gear means is of the planetary gear type. In a comparatively conventional way, it comprises gear wheels cooperating with the first shaft member, planet wheels, a planet holder device, a fixed gear rim, and a gear ring in engagement with the braking means.

Planetary gear devices are comparatively expensive, which may be a drawback in the road vehicle industry, where costs have to be kept down. They also tend to emit noise, which is a further drawback in a road vehicle environment.

The object of the invention is to provide an arrangement without the mentioned drawbacks but maintaining the reliability in construction and function of the planetary gear device.

THE INVENTION

This is according to the invention attained in that means for transmitting said differential rotational speed to the braking means comprises a roller arrangement.

Preferably, the roller arrangement comprises a cylindrical roller cage with two sets of rollers. Neighboring rollers from the two sets of rollers may be rotatably arranged on a common shaft.

The first set of rollers is preferably mounted for rolling in an outer ring and the second set of rollers in a gear ring. The rollers are prestressed by the outer ring and the gear ring, respectively.

The outer ring is held against rotation in relation to a housing of the device, whereas the gear ring is in engagement with a brake shaft of the braking means.

Further, the first set of rollers is preferably mounted to roll on a rotatable thrust ring on a first shaft member, whereas the second set of rollers is mounted to roll on a non-rotatable thrust ring on the first shaft member.

By the prestress of the rollers, a frictional connection is attained.

BRIEF DESCRIPTION OF THE DRAWINGS

The invention will be described in further detail below reference being made to the accompanying drawings, in which FIG. 2 is a perspective view of a roller arrangement of the device shown in FIG. 1.

DETAILED DESCRIPTION OF A PREFERRED EMBODIMENT

Figure 1:
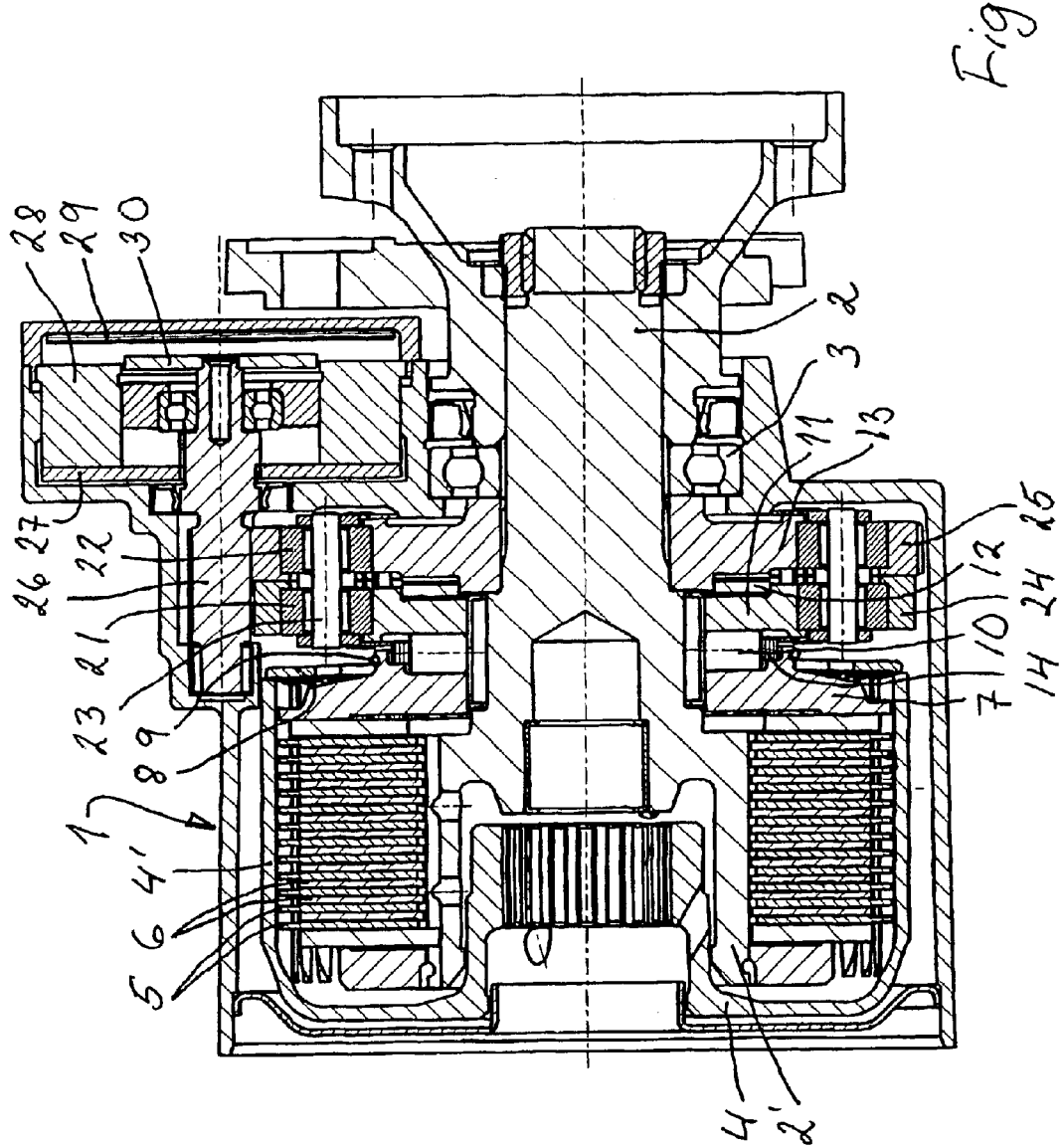
FIG. 1 is a side view in section of a device according to the invention.

Referring to FIG. 1, a device according to the invention is arranged in a housing 1, which comprises several parts but is not further described.

A first shaft member 2, extending to the right in FIG. 1, is rotatably journalled by means of a bearing 3 in the housing 1, which may be mounted in a road vehicle. A second shaft member 4 to the left in FIG. 1 is illustrated as a sleeve-shaped part with central internal splines for cooperation with external splines on a shaft, which is not shown. This shaft is to be journalled for independent rotation in the first shaft member 2.

The two shaft members 2 and 4 are to be connected to further parts (not shown) in said vehicle. Only limited relative axial movements are permitted between the two shaft members.

The shaft members 2 and 4 shall be freely rotatable relative to each other, if the rotation differential between them is comparatively low. If the rotation differential is higher or is increased over a certain limit, the shaft members shall be frictionally connected, so that further increase of the rotation differential is counteracted. The connection conditions shall be independent of the rotation direction and which member that rotates faster than the other.

The frictional connection is established by means of a number of alternate clutch discs or rings 5 and 6, which are splined to an outer surface of a generally sleeve-shaped part 2' of the first shaft member 2 to the right in the drawing and an inner surface of a generally sleeve-shaped part 4' of the second shaft member 4, respectively.

At its outer periphery a ring-shaped pressure plate 7 is in splines-engagement with the left shaft member 4 via its part 4' and is rotatable in relation to the right shaft member 2. A cup spring 8 is arranged with its outer periphery against the sleeve-shaped part 4' of the second shaft member 4 and its inner periphery in engagement with the pressure plate 7 by means of a spring clip 9. The cup spring 8 biasses the pressure plate 7 to the right in the drawing.

In cooperation with the pressure plate 7 are rollers 10, a rotatable thrust ring 11, an axial bearing 12, and a non-rotatable thrust ring 13 fixed on the right shaft member 2. (By "non-rotatable" is in this case thus meant non-rotatable in relation to the first shaft member 2.)

On their axial surfaces facing each other, the pressure plate 7 and the rotatable thrust ring 11 are provided with ramps, as is described and schematically illustrated in WO 98/26950. The number of ramps evenly distributed on the periphery is two or more, corresponding to the number of rollers-10. These rollers 10 are held in proper positions by a roller cage 14.

From the illustration in WO 98/26950 it is evident that the pressure plate 7 and the rotatable thrust plate 11 are brought apart, when they are turned in relation to each other, so that each roller 10 climbs the ramps.

Due to the force from the spring 8 and the inclination angle of the ramps a certain torque will be transmitted to the rotatable thrust ring 11 at a rotation of the pressure plate 7. If this torque is exceeded, so that the pressure plate 7 and the rotatable thrust ring 11 are turned in relation to each other, the rollers 10 will enter the ramps displacing the pressure plate 7 axially to the left in the drawing, so that the clutch discs 5 and 6 are engaged frictionally and connect the shaft members 2 and 4.

As already stated, a rotatable thrust ring 11 is movably arranged on the right shaft member 2. A further, non-rotatable thrust ring 13 is provided on the right shaft member 2 itself adjacent the rotatable thrust ring 11. A roller arrangement to be further described with reference to FIG. 2 is arranged around the two thrust rings 11 and 13.

An annular roller cage 20 is provided with two sets of rollers 21 and 22, which are equidistantly distributed around the roller cage 20. Each pair of rollers 21 and 22 may be rotatably arranged on a common roller cage shaft 23. In the shown case the number of rollers 21 and 22 in each set is twelve.

As appears in FIG. 1, the rollers 21 of the first set are mounted to roll on the rotatable thrust ring 11 and the rollers 22 of the second set on the non-rotatable thrust ring 13.

Correspondingly, the rollers 21 of the first set are mounted for rolling in a fixed outer ring 24 and the rollers 22 of the second set in a gear ring 25, as appears both in FIG. 1 and FIG. 2. It appears in FIG. 2 that the outer ring 24 is provided with a protrusion 24' for fixed engagement with a corresponding notch in the housing 1.

In order to obtain the desired function, corresponding to the function of the planetary gear device of WO 98/26950, the rollers 21 and 22 have to be radially prestressed. In practice this is obtained in that the outer rings 24 and 25 have a somewhat smaller diameter than required for the rollers 21 and 22, so that a frictional connection is established.

The design and dimensioning of the roller arrangement 20–25 is such that the gear ring 25 will not be imparted any motion, if the thrust rings 11 and 13 rotate with the same speed or do not rotate.

The external gears of the gear ring 25 are in engagement with gears of a brake shaft 26, which is journalled in the housing 1.

The brake shaft 26 is provided with a brake disc 27, constituting one part of an electromagnetic brake, whose second part is a fixed, preferably cylindrical electromagnet 28. An electronic control card 29 may be mounted in the housing 1.

The rotation differential may be supervised in the brake 27, 28 or possibly directly on the shaft members 2 and 4. The technique for sensing and transmitting the rotation differential is state of the art. A rotation sensor may for example be arranged in a brake shaft disc 30 in the vicinity of the control card 29.

When the sensed rotation differential exceeds a predetermined value, the electromagnet 28 will be energized for frictionally braking the brake disc 27 and thus the brake shaft 26.

The function of the described device is as follows:

a) The Shaft Members 2 and 4 Rotate with the Same Speed.

The non-rotatable thrust ring 13 is integral with and thus rotates with the same speed as the right shaft member 2. The pressure plate 7 rotates with the same speed as the left shaft member 4. Due to the torque exerted by the spring 8 on the rotatable thrust ring 11 also the latter will rotate with the same speed as the shaft member 4. As the thrust rings 11 and 13 rotate with the same speed, the gear ring 25 will remain stationary. No activation of the clutch discs 5 and 6 will occur.

b) The Shaft Members 2 and 4 Rotate with a Rotation Differential Under the Limit Value.

Again, the non-rotatable thrust ring 13 rotates with the same rotational speed as the right shaft member 2, whereas the pressure plate 7 rotates with the same speed as the left shaft member 4. Due to the torque exerted by the spring 8 also the rotatable thrust ring 11 rotates with the same speed as the left shaft member 4. This means that the two thrust rings 11 and 13 now rotate with different speeds, so that the gear ring 25 and the brake shaft 26 rotate. However, as the rotation differential is below the set limit, the electromagnetic brake 27, 28 is not activated. No activation of the clutch discs 5 and 6 will accordingly occur.

c) The Shaft Members 2 and 4 Rotate with a Higher Rotation Differential.

As earlier, the non-rotatable thrust ring 13 rotates with the right shaft member 2 and the pressure plate 7 with the left shaft member 4. The rotatable thrust ring 11 also rotates with the same speed as the left shaft member 4 due to the torque exerted by the spring 8. The thrust rings 11 and 13 rotate with different speeds, so that the gear ring 25 and the brake shaft 26 rotate. When the rotation differential is higher than a predetermined level, the electromagnetic brake 27, 28 is actuated. When the gear ring 25 is braked via the brake shaft 26, the rotatable thrust ring 11 is turned in relation to the pressure plate 7, so that the clutch discs 5 and 6 engage and counteract a further increase of the rotation differential. This engagement of the clutch discs 5 and 6 creates a further torque on the rotatable thrust ring 11. This further torque is proportional to the torque which the clutch discs 5 and 6 have to transfer for preventing the rotation differential from increasing. The total torque on the rotatable thrust ring 11 is in this case the sum of the two mentioned torques.

The device contains a rotationally fedback electromagnetic friction brake. The rotational speed of the brake shaft or in other words the rotational differential is continuously monitored. The torque transmitting device is controlled in that the current in the electromagnetic brake is varied in such a way that the rotational speed of the brake disc is kept within predetermined limits. The torque transmitted by the overall device is proportional to the current in the electromagnetic brake.

The shown and described roller arrangement is to be seen as an example of possible practical solutions within the general idea to replace a planetary gear device with a radially prestressed roller arrangement with two roller sets in a common roller cage.

It is within the scope of the invention to have other practical brake means than the shown and described electromagnetic brake. For example, an electric brake such as shown in WO 98/26950 may alternatively be employed.

What is claimed is:

1. A device for transmitting torque between two rotatable coaxial shaft members, the device comprising a plurality of alternate clutch discs connected to the two shaft members and engageable to counteract differential rotational speed between the shaft members, braking means for braking rotational movement wherein rotational velocity in the braking means is proportional to said differential rotational speed, and means for transmitting said differential rotational speed to the braking means comprising a roller arrangement; wherein the roller arrangement comprises a cylindrical roller cage with two sets of rollers; wherein a first set of said two sets of rollers is mounted for rolling in an outer ring and a second set of said two sets of rollers is mounted in a gear ring; and wherein the rollers of said first set and said second set are radially prestressed by the outer ring and the gear ring respectively.

2. A device for transmitting torque between two rotatable coaxial shaft members, the device comprising a plurality of alternate clutch discs connected to the two shaft members, means for engaging the clutch discs in order to counteract differential rotational speed between the shaft members, said means comprising a pressure plate which is connected to one of the shaft members and is axially displaceable against the clutch discs, and mutually rotatable roller means and ramp means for axially displacing the pressure plate against the clutch discs at a predetermined rotation differential between the shaft members, braking means for braking rotational movement, rotational velocity in the braking means being proportional to said differential rotational speed, and means for transmitting said differential rotational speed to the braking means, wherein the means for transmitting is a roller arrangement with a first set of rollers and a second set of rollers, said first set being mounted for rolling in an outer ring and said second set in a gear ring, wherein neighboring rollers from the first set and the second set are rotatably arranged on a common shaft, the outer ring is non-rotatable and the gear ring is in engagement with a brake shaft of the braking means, and wherein the rollers of said first set and said second set are radially prestressed by the outer ring and the gear ring respectively.

3. A device according to claim 2 wherein the roller arrangement comprises a cylindrical roller cage with two sets of rollers.

4. A device according to claim 3 wherein said first set of rollers is mounted to roll on a rotatable thrust ring on a first shaft member and said second set of rollers is mounted to roll on a non-rotatable thrust ring on the first shaft member.

* * * * *